(12) United States Patent
Levin et al.

(10) Patent No.: US 8,411,259 B2
(45) Date of Patent: Apr. 2, 2013

(54) OPTICAL TIME-DOMAIN REFLECTOMETER

(75) Inventors: Piotr Anatolij Levin, Vilnius (LT); Chris Blair, Canterbury, NH (US)

(73) Assignees: AFL Telecommunications LLC, Spartanburg, SC (US); Lifodas, UAB, Vilnius (LT)

( * ) Notice: Subject to any disclaimer, the term of this patent is extended or adjusted under 35 U.S.C. 154(b) by 522 days.

(21) Appl. No.: 12/597,845

(22) PCT Filed: May 11, 2009

(86) PCT No.: PCT/US2009/043414
§ 371 (c)(1),
(2), (4) Date: Oct. 27, 2009

(87) PCT Pub. No.: WO2009/137823
PCT Pub. Date: Nov. 12, 2009

(65) Prior Publication Data
US 2011/0141457 A1 Jun. 16, 2011

Related U.S. Application Data

(60) Provisional application No. 61/051,807, filed on May 9, 2008, provisional application No. 61/097,290, filed on Sep. 16, 2008.

(51) Int. Cl.
*G01N 21/00* (2006.01)
*H04B 10/08* (2006.01)
*H04B 17/00* (2006.01)

(52) U.S. Cl. .......................................... 356/73.1; 398/9
(58) Field of Classification Search ..................... None
See application file for complete search history.

(56) References Cited

U.S. PATENT DOCUMENTS

| 3,981,592 | A * | 9/1976 | Williams .................... 356/73.1 |
| 4,799,797 | A | 1/1989 | Huggins |
| 5,285,305 | A * | 2/1994 | Cohen et al. .................... 398/31 |
| 5,359,192 | A | 10/1994 | Williams |
| 5,534,994 | A * | 7/1996 | Hanson et al. ................ 356/73.1 |
| 5,825,479 | A | 10/1998 | Thompson et al. |
| 6,141,089 | A * | 10/2000 | Thoma et al. ................. 356/73.1 |
| 6,611,322 | B1 | 8/2003 | Nakayama et al. |
| 7,411,666 | B2 * | 8/2008 | Beller .......................... 356/73.1 |
| 7,561,798 | B2 * | 7/2009 | Kokkinos ........................ 398/31 |
| 8,077,298 | B2 * | 12/2011 | Wang et al. .................. 356/73.1 |
| 2005/0117840 | A1 * | 6/2005 | Beller ............................ 385/24 |
| 2005/0286895 | A1 | 12/2005 | Lee et al. |
| 2007/0019956 | A1 * | 1/2007 | Sorin et al. ...................... 398/71 |
| 2009/0129773 | A1 * | 5/2009 | Oron ............................... 398/10 |

* cited by examiner

*Primary Examiner* — Gordon Stock, Jr.
(74) *Attorney, Agent, or Firm* — Sughrue Mion, PLLC (57) ABSTRACT

A optical time domain reflectometer (OTDR) which sends and receives pulses for multiple frequencies down a fiber under testing (FUT). These frequencies can include frequencies for testing a live FUT and frequencies for testing a dark FUT. The pulses of the various frequencies are sent and received through a single optical connection with the FUT. The number of connections necessary to test the fiber is thus reduced. The OTDR may also include a built in passive optical network (PON) power meter, which measures the power level of the fiber over the same single optical connection.

15 Claims, 6 Drawing Sheets

OPTICAL TIME-DOMAIN REFLECTOMETER

CROSS-REFERENCE TO RELATED APPLICATIONS

This application claims priority from U.S. Provisional Application No. 61/051,807 filed on May 9, 2008 and U.S. Provisional Application No. 61/097,290 filed on Sep. 16, 2008 in the United States Patent Office, the disclosure of both of which are incorporated herein in their entirety by reference.

BACKGROUND OF THE INVENTION

1. Field of the Invention

Methods and apparatuses consistent with the present invention relate to optical time-domain reflectometry, and more particularly to optical time-domain reflectometry requiring fewer optical connections to a fiber under testing.

2. Description of the Related Art

Optical fibers and fiber networks are integral to modern communication systems. Testing of optical fibers is often accomplished by optical time-domain reflectometry, which sends optical signals into a fiber and analyzes reflections based on the timing and power of reflected signals. This information can be used to assess problems that an optical fiber or network may have due to poor connections, etc.

Existing optical time-domain reflectometers (OTDRs) have a number of ports for different uses, for example, one port for dark (out-of-service) testing, and one port for live (in-service) testing. This has several disadvantages. First, the device must be built with separate ports for live and dark testing, or perhaps even separate devices. Also, all available frequencies are typically not found on the dark port, so a dark fiber must be connected to both the dark and live ports in order for all wavelengths to be tested. Many OTDRs today use one port for multiple lasers and a single APD, for example 1310/1550/1625 nm. However, the existing OTDRs do not filter the received signal to multiple APDs so that the OTDR can function as both a dark and live fiber (out of band) OTDR from the same port.

Additionally, existing devices require a technician to use a passive optical network (PON) power meter to measure power levels in at the optical network terminal (ONT) (customer) location. If low or no power is detected, the OTDR live port is used to further troubleshoot the problem. Existing OTDR devices thus require the use of multiple devices, multiple ports, and multiple connections, which impedes efficient fiber optic network installation and servicing. Similarly some existing OTDRs combine a 1490/1550 nm PON meter on the same port with a single, unfiltered OTDR wavelength (e.g. 1550 nm or 780 nm). However, the no existing OTDR combines the PON meter with a live and dark fiber OTDR on the same port.

SUMMARY OF THE INVENTION

Accordingly, the present invention has been made to solve the above-mentioned problems occurring in the related art, and additional or other problems. However, the present invention is not required to overcome the above-mentioned problems, and exemplary embodiments of the present invention may not overcome any of the problems.

According to an aspect of the present invention, there is provided an optical time-domain reflectometer (OTDR) which includes a pulse generator, a multi-wavelength detector which includes a plurality of detectors, where each detector corresponds to a different wavelength of light, a coupler which simultaneously couples the plurality of detectors of the multi-wavelength detector to the fiber at a single optical port, and a controller which controls an operation of the pulse generator and the multi-wavelength detector.

The pulse generator of the OTDR generates a plurality of light pulses at a plurality of wavelengths, wherein the pulse generator generates at least one light pulse at a wavelength, if the fiber is live, and at least one light pulse at a wavelength, if the fiber is dark.

The plurality of detectors of the multi-wavelength detector of the OTDR may be avalanche photodiode detectors.

The OTDR may further comprise a plurality of passive optical network (PON) power detectors, each detector corresponding to a different wavelength of light, wherein the coupler simultaneously couples the plurality of detectors of the multi-wavelength detector and the plurality of PON power detectors to the fiber at the single optical port. The plurality of PON power detectors may be photodiodes, or be integrated with the pulse generator, and the operation of the plurality of PON power detectors may be controlled by the controller.

According to another aspect of the present invention, there is provided a method of operating an optical time-domain reflectometer (OTDR) including coupling a plurality of detectors, each corresponding to a different wavelength of light, to the fiber at a single optical port, detecting light from the fiber, by the plurality of detectors, at each wavelength of light corresponding to each detector, determining whether light at each wavelength of light corresponding to each detector exists on the fiber, and controlling the operation of the OTDR based on the determination of whether light exists on the fiber.

If a detector does not detect light at the wavelength corresponding to the detector, then operation of the OTDR at the wavelength may be allowed. Whereas, if a detector detects light at the wavelength corresponding to the detector, then operation of the OTDR at the wavelength may not be allowed. If however, each of the plurality of detectors does not detect light at each wavelength corresponding to each detector, then operation of the OTDR may be allowed at any wavelength.

The operation of the OTDR may comprise generating at least one pulse of light at a particular wavelength, transmitting the at least one pulse of light through the fiber via the single optical port, receiving light from the fiber in response to the transmitted at least one pulse of light, detecting the received light with at least one of the plurality of detectors, and outputting a value detected by the at least one of the plurality of detectors.

The operation of the OTDR may further comprise detecting a power level of the light at each wavelength that is determined to exist, and controlling the operation of the OTDR based the detected power level of the light. If the detected power level at a wavelength of light is determined to be a normal power level, then operation of the OTDR at the wavelength of light may not be allowed. Whereas, if the detected power level at a wavelength of light is determined to be below a normal power level, then operation of the OTDR at the wavelength of light may be allowed. However, if the detected power level at each wavelength of light is determined to be below a normal power level, then operation of the OTDR may be allowed at any wavelength.

BRIEF DESCRIPTION OF THE DRAWINGS

The above and other objects, features and advantages of the present invention will be apparent from the following detailed description taken in conjunction with the accompanying drawings, in which.

DETAILED DESCRIPTION OF EXEMPLARY EMBODIMENTS OF THE INVENTION

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and will fully convey the concept of the invention to those skilled in the art, and the present invention will only be defined by the appended claims. Like reference numerals refer to like elements throughout the specification.

Figure 1:
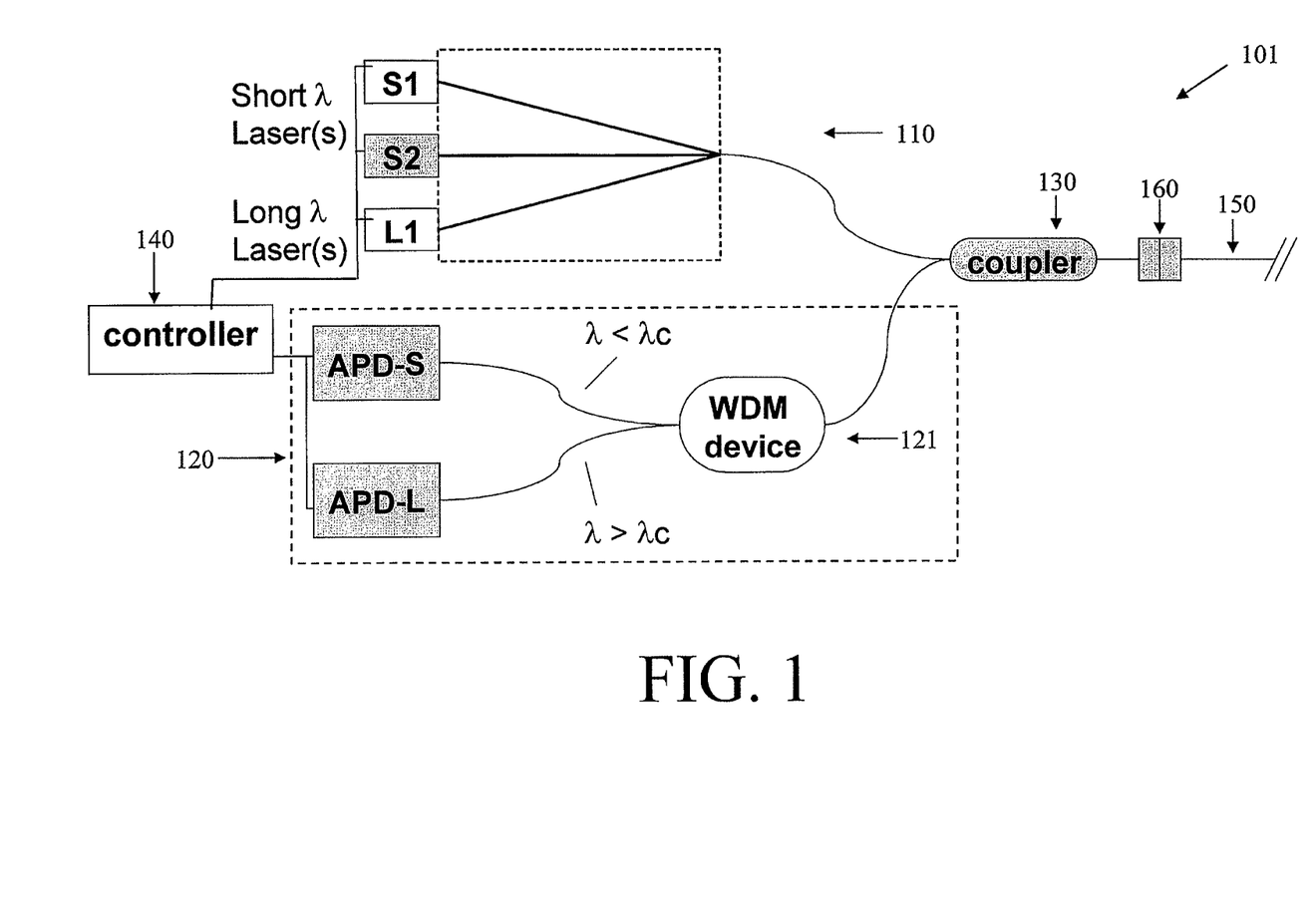
FIG. 1 illustrates the components of an OTDR according to an exemplary embodiment of the present invention.

FIG. 1 is an illustration of an OTDR system 101 according to an exemplary embodiment of the present invention, which comprises an OTDR pulse generation unit 110, a light detection unit 120, a coupler 130, and an OTDR controller 140. In usage, the OTDR system is coupled to a fiber under testing (FUT) 150. The OTDR system is coupled to the FUT 150 at coupling interface 160.

OTDR pulse generation unit of this embodiment is a laser block with a pigtail. FIG. 1 shows three lasers S1, S2 and L1, each corresponding to a wavelength of light, that are connected to the pigtail as light source. While this illustrative embodiment uses a pigtail, various other means known in the art for coupling one or more light sources together can also be used.

The controller 140 controls the lasers S1, S2, and L1 to emit pulses. Depending on the mode of use of the OTDR system, pulses can be emitted from one, multiple, or all lasers in the pulse generation unit 110. The pulses travel to the coupler 130, and are coupled into the fiber under testing (FUT) 150 at the coupling interface 160. The pulses then travel down the FUT 150. At locations where there is a change in optical index of refraction or an optical interface, such as a bend or break in the fiber, an interface with a connector or other fiber, etc., there is a partial (or complete) reflection of the pulses. The reflected pulses travel back up the FUT 150 toward the OTDR system. The reflected pulses are coupled back into the OTDR system at the coupling interface 160.

The pulses then travel through the coupler 130 to the light detection unit 120. The light detection unit 120 comprises a wavelength multiplexing (WDM) device 121, and one or more avalanche photodiodes (APDs). In this exemplary embodiment, the light detection unit 120 comprises APD-S and APD-L. The light pulses are wavelength separated at the WDM, with higher frequency light (light of wavelength shorter than $\lambda_c$) sent to APD-S, and lower frequency light (light of wavelength longer than $\lambda_c$) sent to APD-L. APD-S and APD-L then convert the reflected pulses into a electrical signal. The controller 140 analyzes the pulses using various analytical techniques known in the art and outputs information about the system to an output device (not shown) such as a display screen. The OTDR system according to this exemplary embodiment allows for outputting information about a live or dark fiber optic line, with a single interface connection to the FUT. A user therefore may save time by only having to make a single connection to the FUT in order to analyze a fiber.

Figure 4:
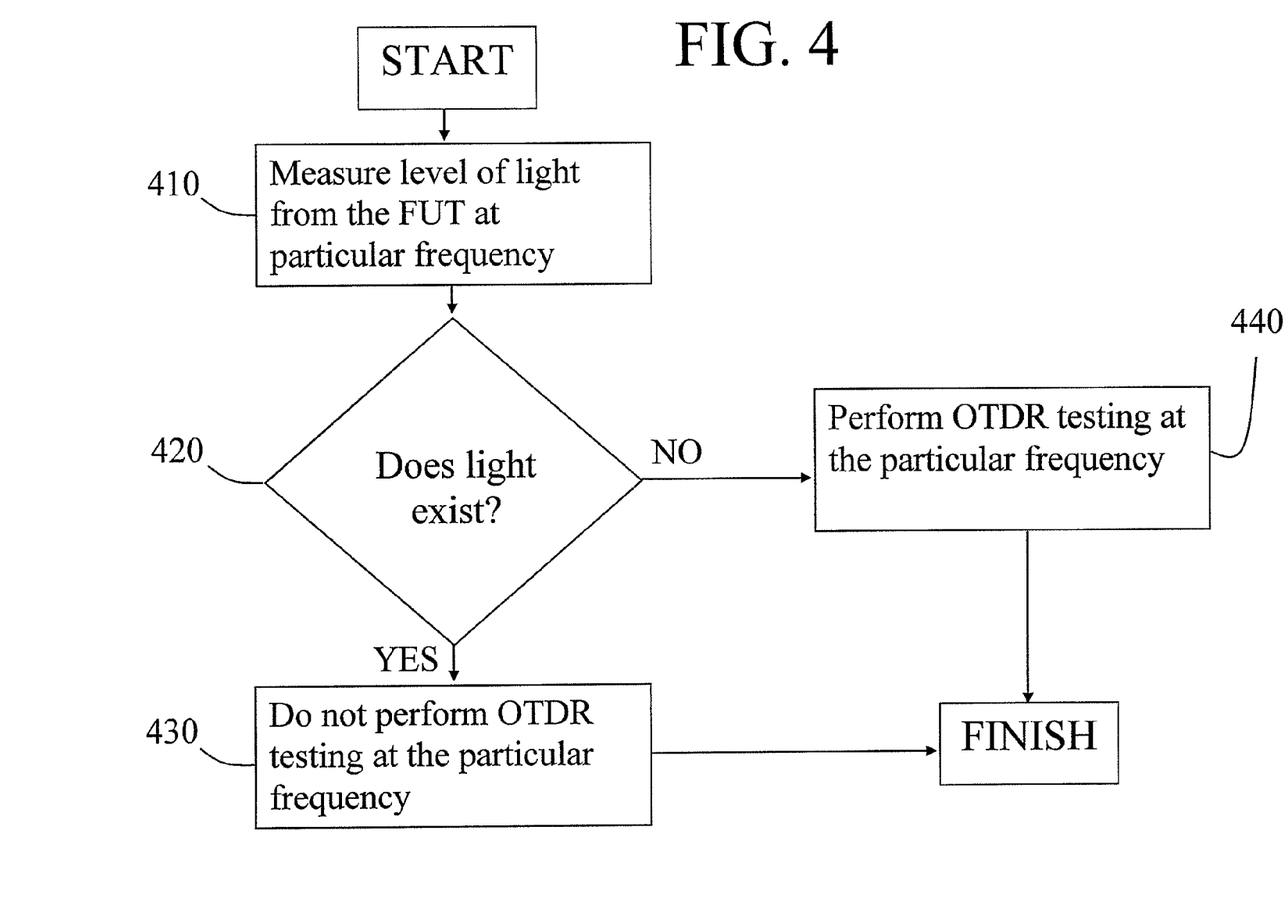
FIG. 4 illustrates a method of operation of an OTDR according to an exemplary embodiment of the present invention.

A method of using the OTDR system of FIG. 1 is shown in FIG. 4. Prior to starting the operation, a user connects a fiber as a fiber under test (FUT) to a port of the OTDR. As used in this specification, a port is any connection to an optical fiber that allows light to be sent to or received from the fiber, and may be an exemplary embodiment of the coupling interface 160. The user then indicates to the OTDR device that operation is to begin. Alternatively, the OTDR system may detect that the FUT has been connected to the OTDR and commence operation automatically.

In operation 410, prior to the OTDR pulse generating unit emitting any light pulses, light from the FUT is detected at an APD. For example, APD-S will detect any light of wavelength shorter than $\lambda_c$ incoming from the FUT, and APD-L will detect any light of wavelength longer than $\lambda_c$ incoming from the FUT. The level of light is measured at the APD to determine if there is, or is not, light at the particular frequency or frequencies corresponding to the APD. If light exists on the FUT at the measured frequency, then OTDR testing may not be performed at that frequency. In operation 420, it is determined if light exists at the measured frequency. If light does not exist (NO), then in operation 440 OTDR testing may occur at the measured frequency. The OTDR system then commences testing, with light emitted at the frequencies corresponding to the measured frequency. If light does exist on the fiber, (NO), then in operation 430 no OTDR testing is performed at the measured frequency.

Figure 2:
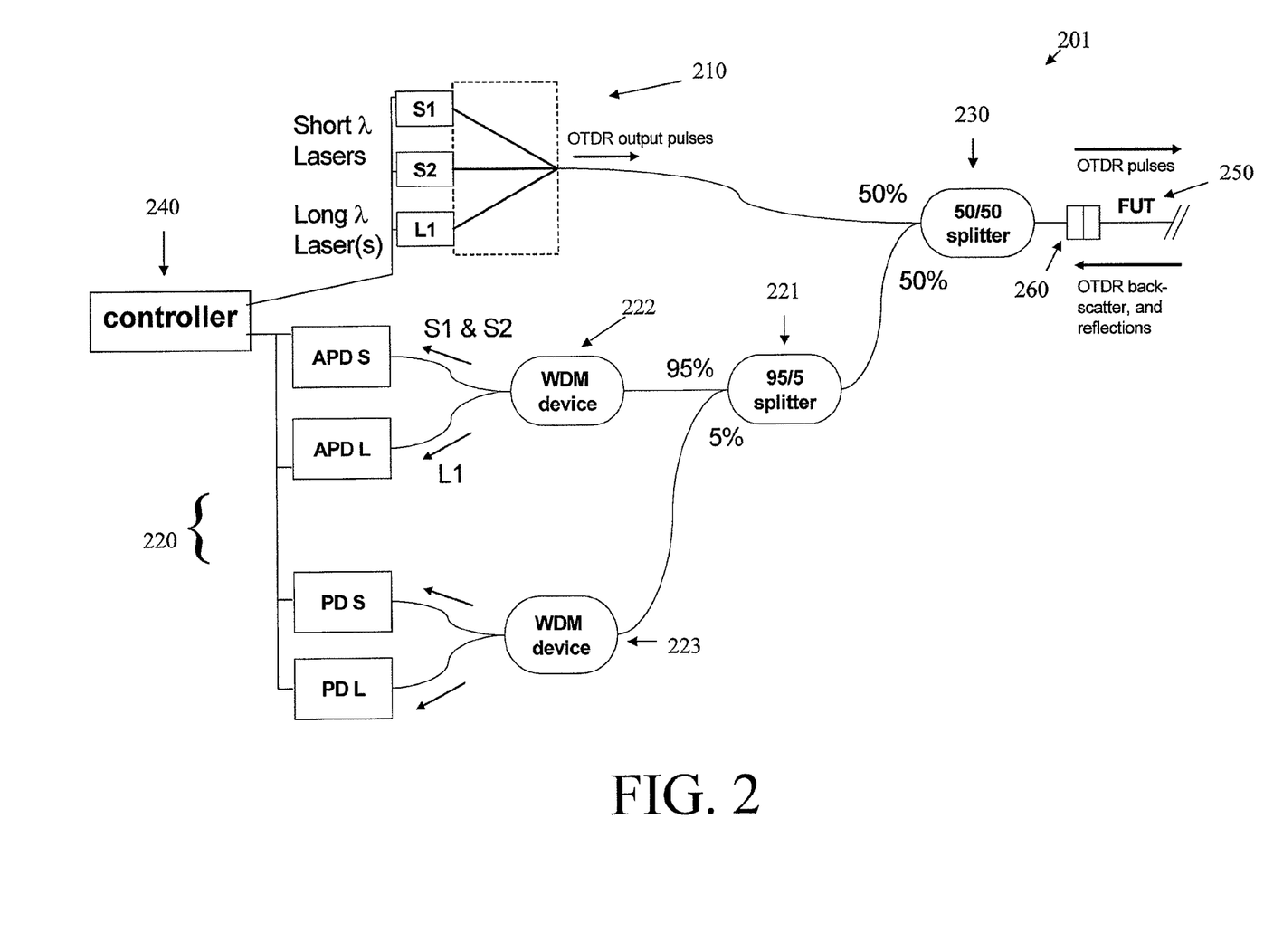
FIG. 2 illustrates the components of an OTDR according to another exemplary embodiment of the present invention.

FIG. 2 is an illustration of an OTDR system 201 according to an exemplary embodiment of the present invention, which comprises an OTDR pulse generation unit 210, a light detection unit 220, a coupler 230, and an OTDR controller 240. In usage, the OTDR system is coupled to a fiber under testing (FUT) 250. The OTDR system is coupled to the FUT 250 at coupling interface 260.

Coupler 230 of this embodiment comprises a 50/50 splitter, although other elements for dividing a light signal can also be used. As before, light pulses are sent from the pulse generation unit 210 down the fiber under testing (FUT) 250. The reflected pulses are sent by 50/50 splitter 230 to the light detection unit 220.

The light detection unit 220 of this embodiment comprises a splitter 221, WDMs 222 and 223, avalanche photodiodes APD-S and APD-L, and photodiodes PD-S and PD-L. It should be noted that the present invention is not limited to just the two photodiodes PD-S and PD-L, and like the avalanche photodiodes, exemplary embodiments of the present invention may comprise just one photodiode or any number greater than one. The splitter 221 of this illustrative embodiment is a 95/5 splitter, but various other divisions of light may be used as well. In the case of the 95/5 splitter, 95% of the light coming into the light detection unit 220 is sent to WDM 222. The WDM 222 sends low frequency light to APD-L and high frequency light to APD-S. Similarly to the previous embodiment, the pulses are converted into electrical signals by the APD-S and APD-L, which are analyzed by controller 240.

The remaining 5% of the light split by the splitter 221 is sent to WDM 223. WDM 223, like the WDM 222, separates the pulses on the basis of frequencies, and sends higher frequency light to PD-S and lower frequency light to PD-L. Photodiodes PD-S and PD-L convert the pulses into electrical signals, and serve to measure the power of the signal. PD-S and PD-L therefore allow the OTDR system to take a passive power measurement and to thus substitute for a passive optical network (PON) power meter. Conventionally, a user performing maintenance, installation, etc., of a fiber optic system will carry a PON power meter and additionally an OTDR device. The user is required to utilize both devices separately, and additionally separate live and dark ports on the OTDR device, to analyze the optical fibers. By using an OTDR device according to the present embodiment, a user does not need a separate PON power meter and needs only make a single connection to the OTDR device, thus saving time and weight for the user.

Additionally, the controller 240 can be configured to control the function of the elements of the OTDR system in order to automatically perform several steps of analysis for a user of the OTDR system.

Figure 5:
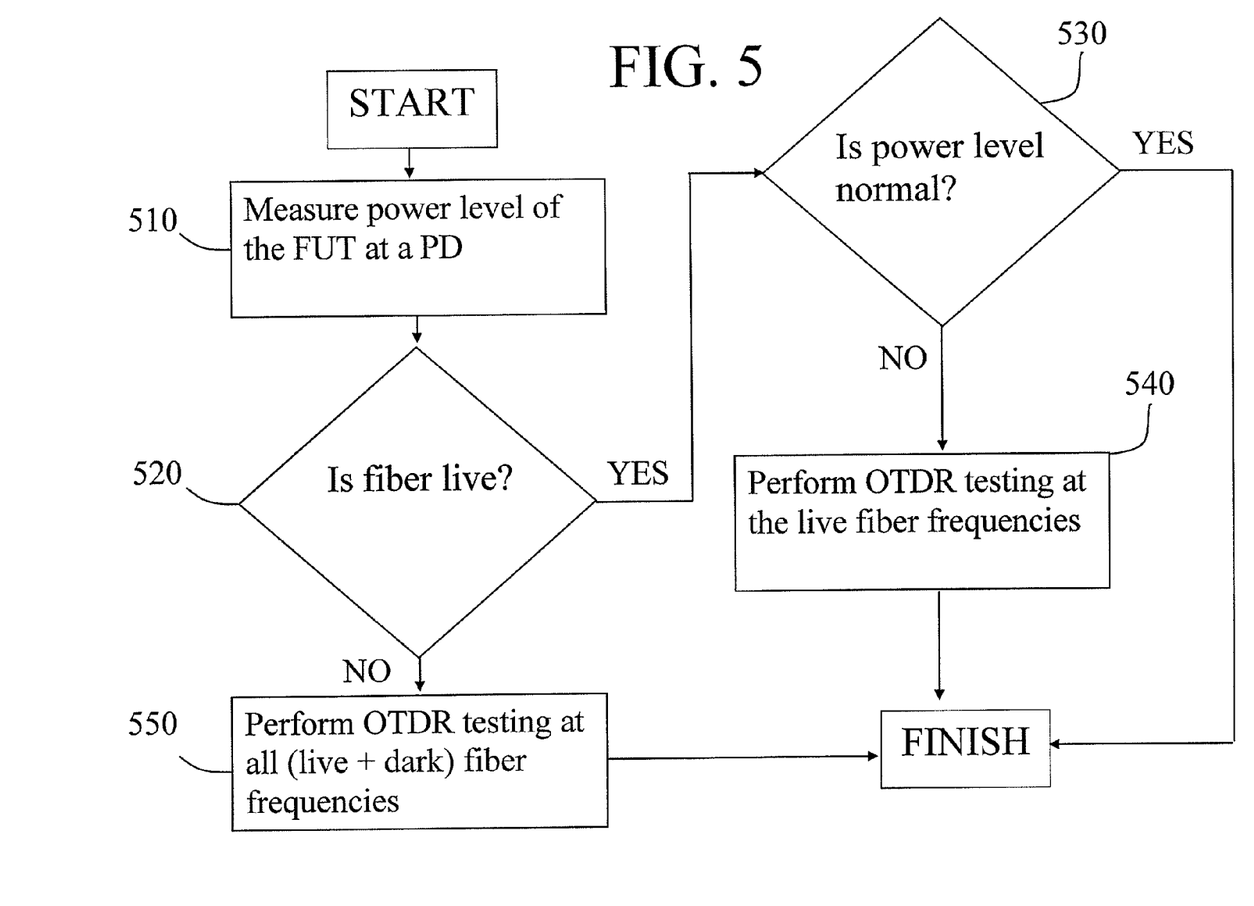
FIG. 5 illustrates a method of operation of an OTDR according to another exemplary embodiment of the present invention.

A method of using the OTDR system of illustrated in FIG. 2 is shown in FIG. 5. Prior to starting the operation, the user of the OTDR system connects a fiber as a fiber under test (FUT) to an OTDR port, which is an exemplary embodiment of the coupling interface 260. The user then indicates to the OTDR device that operation is to begin. Alternatively, the OTDR device may detect that the FUT has been connected to the OTDR and commence operation automatically.

In operation 510, light from the FUT is received into a PD (such as PD S and/or PD L). The PD measures a PON power level of the received light. The operation of the OTDR is based on the power level of the light as measured by the PD.

In operation 520, based on the measured power level, it is determined if the fiber is live or dark.

In operation 530, if the fiber is live, it is determined if the power level is a level expected for normal operation. If the power level is a level expected for normal operation, then the OTDR determines that the fiber is operating properly, and further testing is not necessary. The OTDR may output a notice that the power level is normal to an output device such as a display. Alternatively, the OTDR may conduct OTDR analysis of the fiber even though the power is normal. When performing the OTDR analysis of the fiber, the controller 240 limits the OTDR test wavelengths to live fiber wavelengths when the power is detected. Also, before performing the OTDR analysis, the OTDR may first ask the user of the OTDR device, via the controller 240, if the user wants to perform the OTDR test. The OTDR test can be, but does not have to be, fully automatic.

In operation 540, if the power level is less than normal, then the controller 240 activates the pulse generation system to send pulses down the FUT. The reflected pulses are received at the light detection unit 220 and analyzed by the controller 240. Long wavelength laser L1 is used to send the pulses, as short wavelength pulses would have interference from the existing light in the live FUT. In this case, only the APD-L is used to measure the reflected pulses. Results of the analysis are output to a user of the OTDR system. Examples of wavelengths used with dark fiber testing are 1625 nm and 1650 nm. More than one long wavelength laser and/or APD may also be used. Alternatively, even if the power level is less than normal, the OTDR may first ask the user of the OTDR device, via the controller 240, if the user wants to perform the OTDR test.

In operation 550, if no power is detected by the PDs, then the FUT is dark, rather than live. Therefore, all wavelengths can be used for OTDR analysis. Lasers S1, S2, and L1 each produce pulses that are sent down the FUT. Examples of short wavelengths that can be used are 1310, 1490, and 1550 nm. Reflected pulses are sent to the APDs and analyzed by the controller 240. Results of the analysis are output to a user of the OTDR system. Alternatively, even if no power level is detected, the OTDR may first ask the user of the OTDR device, via the controller 240, if the user wants to perform the OTDR test.

Figure 3:
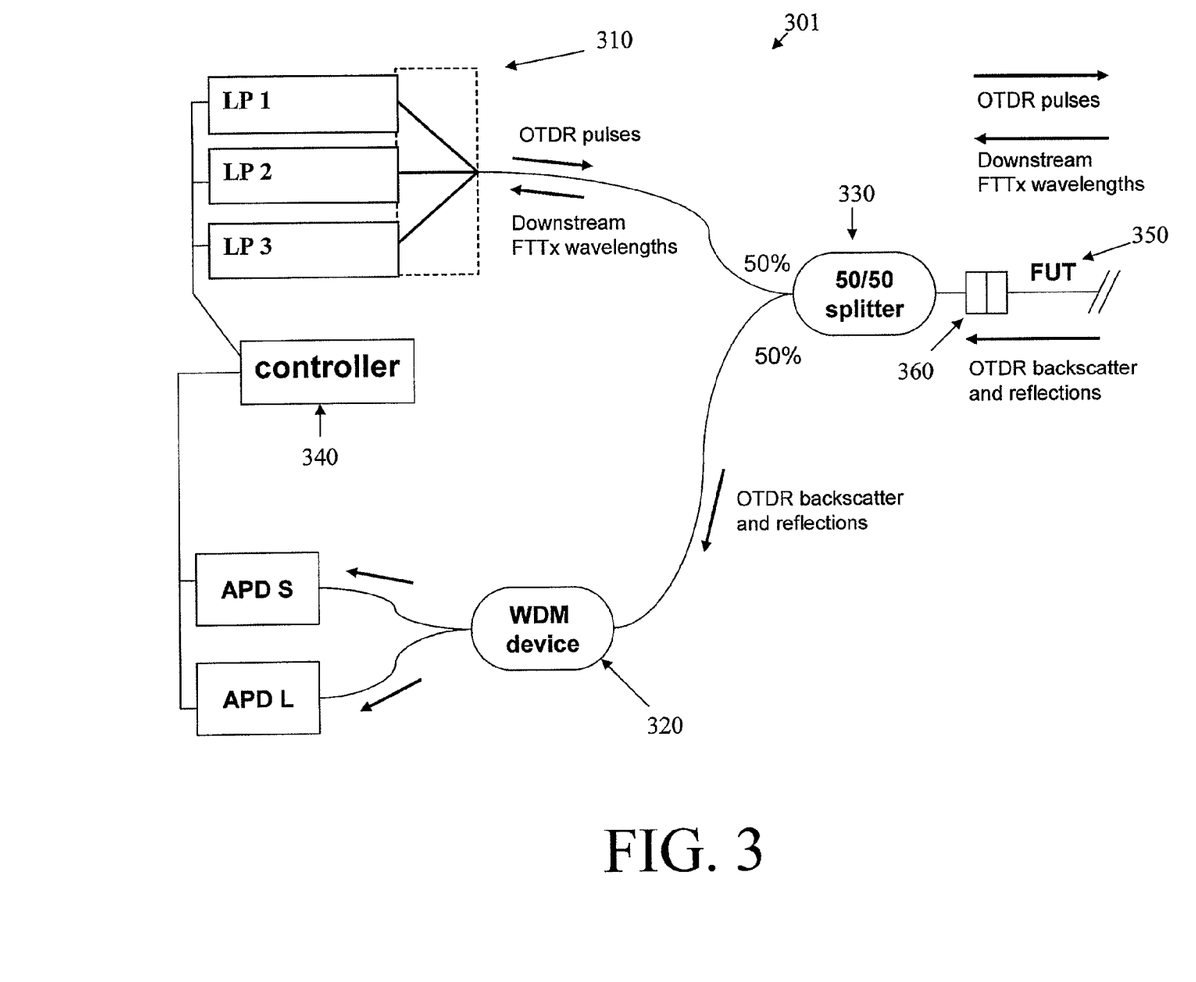
FIG. 3 illustrates the components of an OTDR according to an additional exemplary embodiment of the present invention.

A third exemplary embodiment of the present invention is illustrated in FIG. 3. OTDR system 301 comprises an OTDR pulse generation unit 310, a light detection unit 320, a coupler 330, and an OTDR controller 340. In usage, the OTDR system is coupled to a fiber under testing (FUT) 350. The OTDR system is coupled to the FUT 350 at coupling interface 360.

Pulse generation unit 310 comprises laser diode and photodiode combinations LP1, LP2, and LP3. The photodiode associated with each laser diode may be, for example, a monitor photodiode for that laser diode. Coupler 330 is a 50/50 splitter that sends light coming from the FUT into the OTDR system to the pulse generation unit and light detection unit in equal portions, although difference divisions of light may also be used.

Figure 6:
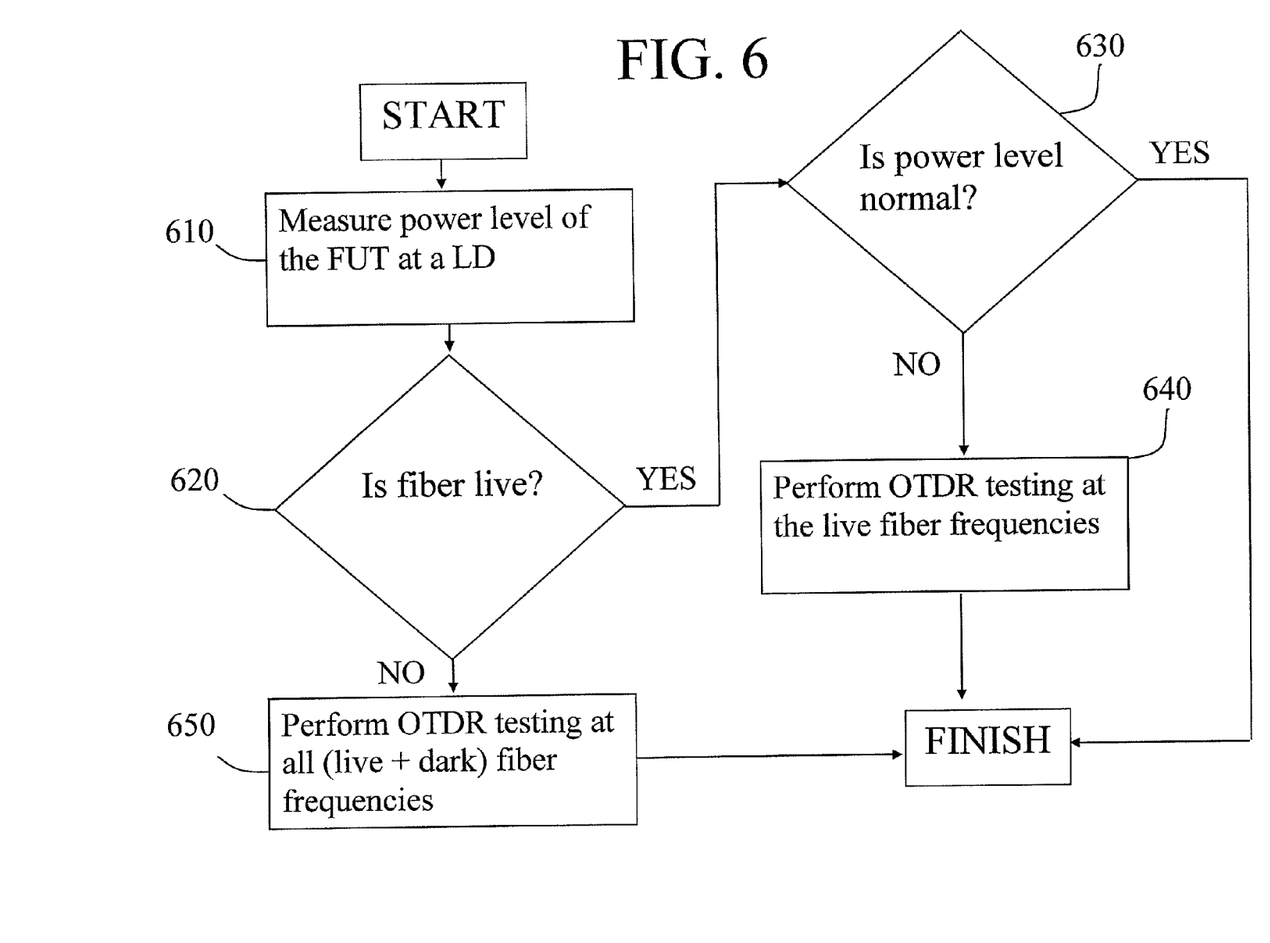
FIG. 6 illustrates a method of operation of an OTDR according to an additional exemplary embodiment of the present invention.

A method of using this embodiment is illustrated in FIG. 6. This method is similar in operation to the method described in FIG. 5. However, in this embodiment, PON power measurements are first taken using the photodiodes in the pulse generation system 310, in operation 610. That is, 50% of the light from the FUT is sent by coupler 330 to the pulse generation system 310. The light is detected by the photodiodes as a PON power measurement. Based on this measurement, the controller 340 determines if FUT is dark or live, in operation 620. If the FUT is live, the controller determines if the power level is normal or low, in operation 630. Based on these determinations, the controller 340 controls operation of the OTDR system to perform testing on all frequencies in operation 650, or perform testing on only live frequencies in operation 640, or to not perform any testing at all, similarly to the method of FIG. 5.

Although exemplary embodiments of the present invention have been described for illustrative purposes, those skilled in the art will appreciate that various modifications, additions and substitutions are possible, without departing from the scope and spirit of the invention as disclosed in the accompanying claims. The foregoing embodiments are merely exemplary and are not to be construed as limiting the present invention. Therefore, the scope of the present invention should be defined by the accompanying claims and their legal equivalents.

What is claimed is:

1. An optical time-domain reflectometer (OTDR), the OTDR comprising:
   a pulse generator;
   a multi-wavelength detector which comprises a plurality of detectors, each detector corresponding to a different wavelength of light;
   a coupler which simultaneously couples the plurality of detectors of the multi-wavelength detector to a fiber under test at a single optical port;
   a controller which controls an operation of the pulse generator and the multi-wavelength detector, and
   a plurality of power detectors, each power detector corresponding to a different wavelength of light,
   wherein the coupler simultaneously couples the plurality of detectors of the multi-wavelength detector and the plurality of power detectors to the fiber at the single optical port.

2. The OTDR according to claim 1, wherein the plurality of detectors of the multi-wavelength detector are avalanche photodiode detectors.

3. The OTDR according to claim 1, wherein the plurality of power detectors are photodiodes.

4. The OTDR according to claim 1, wherein the plurality of power detectors are integrated with the pulse generator.

5. The OTDR according to claim 1, wherein the controller controls the operation of the plurality of power detectors.

6. The OTDR according to claim 1, wherein the pulse generator generates a plurality of light pulses at a plurality of wavelengths.

7. The OTDR according to claim 2, wherein the pulse generator generates at least one light pulse at a wavelength, if the fiber is live, and at least one light pulse at a wavelength, if the fiber is dark.

8. A method of operating an optical time-domain reflectometer (OTDR) comprising:
    coupling a pulse generator to a fiber under test at a single optical port;
    coupling a multi-wavelength detector which comprises a plurality of detectors, each corresponding to a different wavelength of light to the fiber under test at the single optical port;
    coupling a plurality of power detectors, each power detector corresponding to a different wavelength of light, to the fiber under test at the single optical port;
    using the plurality of power detectors to detect a power level of light from the fiber at each wavelength of light corresponding to each power detector;
    using the plurality of power detectors to determine whether light at each wavelength of light corresponding to each power detector exists on the fiber; and
    controlling the operation of the pulse generator and the multi-wavelength detector based on the determination of whether light exists on the fiber.

9. The method of claim 8, wherein if one of the plurality of power detectors does not detect light at a wavelength corresponding to the power detector, then allowing operation of the pulse generator and the multi-wavelength detector at the wavelength.

10. The method of claim 8, wherein if one of the power detectors detects light at a wavelength corresponding to the power detector, then not allowing operation of the pulse generator or the multi-wavelength detector at the wavelength.

11. The method of claim 8, wherein if none of the plurality of power detectors detects light at each wavelength corresponding to each power detector, then allowing operation of the pulse generator and the multi-wavelength detector at any wavelength.

12. The method of claim 8, wherein the controlling the operation of the pulse generator and the multi-wavelength detector comprises:
    generating at least one pulse of light at a particular wavelength;
    transmitting the at least one pulse of light through the fiber via the single optical port;
    receiving light from the fiber in response to the transmitted at least one pulse of light;
    detecting the received light with at least one of the plurality of detectors of the multi-wavelength detector; and
    outputting a value detected by the at least one of the plurality of detectors of the multi-wavelength detector.

13. The method of claim 8, wherein if the detected power level at a wavelength of light is determined to be a normal power level, then not allowing operation of the pulse generator and the multi-wavelength detector at the wavelength of light.

14. The method of claim 8, wherein if the detected power level at a wavelength of light is determined to be below a normal power level, then allowing operation of the pulse generator and the multi-wavelength detector at the wavelength of light.

15. The method of claim 8, wherein if the detected power level at each wavelength of light is determined to be below a normal power level, then allowing operation of the pulse generator and the multi-wavelength detector at any wavelength.

* * * * *